(12) United States Patent
Shanahan

(10) Patent No.: US 7,779,702 B2
(45) Date of Patent: Aug. 24, 2010

(54) FLOW DISTURBANCE COMPENSATION FOR MAGNETIC FLOWMETER

(75) Inventor: Bret A. Shanahan, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 12/290,771

(22) Filed: Nov. 3, 2008

(65) Prior Publication Data

US 2010/0107776 A1    May 6, 2010

(51) Int. Cl.
  *G01F 25/00* (2006.01)
  *G01F 1/56* (2006.01)
  *G01F 1/58* (2006.01)

(52) U.S. Cl. .................. 73/861.08; 73/1.16; 73/861.12; 702/45

(58) Field of Classification Search . 73/861.12–861.17, 73/1.16, 1.25, 1.34; 702/45
See application file for complete search history.

(56) References Cited

U.S. PATENT DOCUMENTS

| | | | |
|---|---|---|---|
| 3,078,712 A | | 2/1963 | Koblenz et al. |
| 3,094,000 A | | 6/1963 | Kass |
| 4,408,497 A | * | 10/1983 | Suzuki ................. 73/861.17 |
| 4,773,274 A | * | 9/1988 | Kobayashi et al. ....... 73/861.16 |
| 4,797,669 A | * | 1/1989 | McGowan et al. ....... 340/870.4 |
| 4,806,905 A | * | 2/1989 | McGowan et al. ..... 340/870.18 |
| 5,079,957 A | * | 1/1992 | Wehrs ................... 73/861.17 |
| 5,103,409 A | * | 4/1992 | Shimizu et al. ............. 702/183 |
| 5,469,746 A | * | 11/1995 | Fukunaga et al. ........ 73/861.12 |
| 5,505,204 A | * | 4/1996 | Picot et al. ............... 600/507 |
| 5,550,537 A | * | 8/1996 | Perdue ................. 340/870.01 |
| 5,621,177 A | * | 4/1997 | Torimaru ................ 73/861.16 |
| 5,639,970 A | * | 6/1997 | Schulz ................... 73/861.12 |
| 5,641,914 A | | 6/1997 | Doll |
| 5,808,208 A | | 9/1998 | Doll |
| 5,956,663 A | * | 9/1999 | Eryurek ..................... 702/183 |
| 6,186,179 B1 | * | 2/2001 | Hill .............................. 138/39 |
| 6,457,367 B1 | * | 10/2002 | Behm et al. .................. 73/753 |
| 6,480,131 B1 | * | 11/2002 | Roper et al. ................. 341/155 |
| 6,484,107 B1 | * | 11/2002 | Roper et al. .................. 702/50 |

(Continued)

FOREIGN PATENT DOCUMENTS

JP       2-71225 U1      5/1990

(Continued)

OTHER PUBLICATIONS

Rosemount 8700 Series Magnetic Flowmeter Systems. Product Data Sheet. Jul. 2004, <http://www.pro-techsolutionsltd.com/PDF/8700.pdf>.*

(Continued)

*Primary Examiner*—Lisa M Caputo
*Assistant Examiner*—Jonathan Dunlap
(74) *Attorney, Agent, or Firm*—Kinney & Lange, P.A.

(57) ABSTRACT

A transmitter for a magnetic flowmeter comprises a current source, memory and a signal processor. The current source energizes the flowmeter, such that the flowmeter generates an induced electromotive force in response to a process flow. The memory stores a flow configuration that describes a flow pipe disturbance in the process flow. The signal processor determines the flow rate as a function of the induced electromagnetic force, and as a further function of the flow configuration.

19 Claims, 2 Drawing Sheets

U.S. PATENT DOCUMENTS

| | | | |
|---|---|---|---|
| 6,494,105 | B1 | 12/2002 | Gallagher |
| 6,516,672 | B2 * | 2/2003 | Wang .......................... 73/718 |
| 6,568,279 | B2 * | 5/2003 | Behm et al. ................... 73/756 |
| 6,571,132 | B1 * | 5/2003 | Davis et al. ..................... 700/2 |
| 6,601,005 | B1 * | 7/2003 | Eryurek et al. .............. 702/104 |
| 6,611,775 | B1 * | 8/2003 | Coursolle et al. ............. 702/65 |
| 6,847,901 | B2 * | 1/2005 | Suzuki et al. ................. 702/38 |
| 6,851,322 | B2 | 2/2005 | Gallagher |
| 6,898,980 | B2 * | 5/2005 | Behm et al. ................... 73/756 |
| 7,010,459 | B2 * | 3/2006 | Eryurek et al. .............. 702/182 |
| 7,093,500 | B2 * | 8/2006 | Schulz et al. ............. 73/861.15 |
| 7,353,119 | B2 * | 4/2008 | Foss et al. ..................... 702/45 |
| 7,421,374 | B2 * | 9/2008 | Zhan et al. .................. 702/189 |
| 7,516,034 | B1 * | 4/2009 | Schulz ........................ 702/100 |
| 7,525,419 | B2 * | 4/2009 | Orth et al. ................... 340/506 |
| 2004/0015302 | A1 * | 1/2004 | Suzuki et al. ................. 702/38 |
| 2004/0024568 | A1 * | 2/2004 | Eryurek et al. .............. 702/182 |
| 2005/0126305 | A1 * | 6/2005 | Schulz et al. ............. 73/861.12 |
| 2006/0277000 | A1 * | 12/2006 | Wehrs ......................... 702/183 |
| 2007/0220993 | A1 | 9/2007 | Yamamoto |
| 2008/0078252 | A1 * | 4/2008 | Graber et al. ............ 73/861.16 |
| 2008/0127712 | A1 * | 6/2008 | Baker ......................... 73/1.16 |
| 2009/0071263 | A1 * | 3/2009 | Schulz .................... 73/861.12 |

FOREIGN PATENT DOCUMENTS

JP     2006-118938 A     5/2006

OTHER PUBLICATIONS

Rosemount 8800 Vortex Installation Effects. Technical Data Sheet. Mar. 2006. <http://www.emersonprocess.com/Rosemount/documents/tds/00816-0100-3250.pdf>.*

Wilderman et al. "Correction of the Reading of a Flow Meter in Pipe Flow Disturbed by Installation Effects." Fluid Mechanics of Flow Metering. Spring Berlin Heidelberg. Dec. 5, 2005, pp. 223-237. <http://www.springerlink.com/content/j95w40333117877q/fulltext.pdf>.*

Ruppel et al. "How to Correct the Error Shift of an Ultrasonic Flow Meter Downstream of Installations." Fluid Mechanics of Flow Metering. Spring Berlin Heidelberg. Dec. 5, 2005, pp. 239-253. <http://www.springerlink.com/content/r45q36256615g857/fulltext.pd>.*

International Search Report and Written Opinion for PCT/US2009/005949.

* cited by examiner

FLOW DISTURBANCE COMPENSATION FOR MAGNETIC FLOWMETER

BACKGROUND

This invention relates generally to flow measurements for process fluid control. Specifically, the invention concerns compensation techniques for magnetic flowmeters subject to upstream or downstream flow pipe disturbances.

Precise and accurate flow control is critical to a wide range of fluid processing applications, including bulk fluid handling, food and beverage preparation, chemistry and pharmaceuticals, water and air distribution, hydrocarbon extraction and processing, environmental control, and a range of manufacturing techniques utilizing thermoplastics, thin films, glues, resins and other fluid materials.

The flow measurement technologies used in each particular application depend upon the fluids involved, and on the relevant process pressures, temperatures and flow rates. Representative technologies include turbine devices that measure flow as a function of mechanical rotation, Pitot sensors and differential pressure devices that measure flow as a function of the Bernoulli effect or pressure drop across a flow restriction, vortex and Coriolis devices that measure flow as a function of vibrational effects, and mass flowmeters that measure flow as a function of thermal conductivity.

Magnetic flowmeters or "mags" distinguish from these technologies in that they characterize flow via Faraday's Law, which depends upon electromagnetic interactions rather than mechanical or thermodynamic effects. In particular, magnetic flowmeters rely upon the conductivity of the process fluid, and the electromotive force or EMF induced as the fluid flows through a region of magnetic field.

Magnetic flowmeters provide particular advantages in "dirty" (erosive and corrosive) flow environments, including hydraulic fracturing and hazardous chemical processing applications, and when other techniques require an inappropriate pressure drop or flow restriction. Because magnetic flowmeters depend upon electromagnetic induction, however, they also pose a number of engineering challenges. In particular, magnetic flowmeters are "single point" measuring devices, rather than multi-point (averaging) devices, making them susceptible to swirl and other non-uniform disturbances in the process flow.

In order to reduce the effect of flow pipe disturbances, installation guidelines typically require a "straight-pipe" installation zone, extending both upstream and downstream of the magnetic flowmeter. Unfortunately, physical, financial and time constraints sometimes make it impossible to install the flowmeter strictly according to these recommendations. There is thus a need for improved magnetic flow measurement techniques that compensate for flow pipe disturbances, improving precision and accuracy while reducing installation cost and providing greater flexibility in system design options.

SUMMARY

This invention concerns a magnetic flowmeter and a transmitter for the magnetic flowmeter. The magnetic flowmeter comprises a pipe section, a coil and at least two opposing probes positioned across the pipe section. The transmitter comprises a current source, a signal processor and a user interface.

The current source energizes the coil, in order to generate a magnetic field across the pipe section. The probes sense an electromotive force induced by process flow through the magnetic field. The signal processor determines the process flow rate as a function of the induced electromotive force.

The transmitter also comprises a user interface. A flow configuration describing the magnetic flowmeter installation is input to the interface, including an upstream or downstream flow pipe disturbance. This allows the signal processor to compensate the flow rate for the flow disturbance, determining a compensated flow rate as a function of the flow configuration.

DETAILED DESCRIPTION

Figure 1:
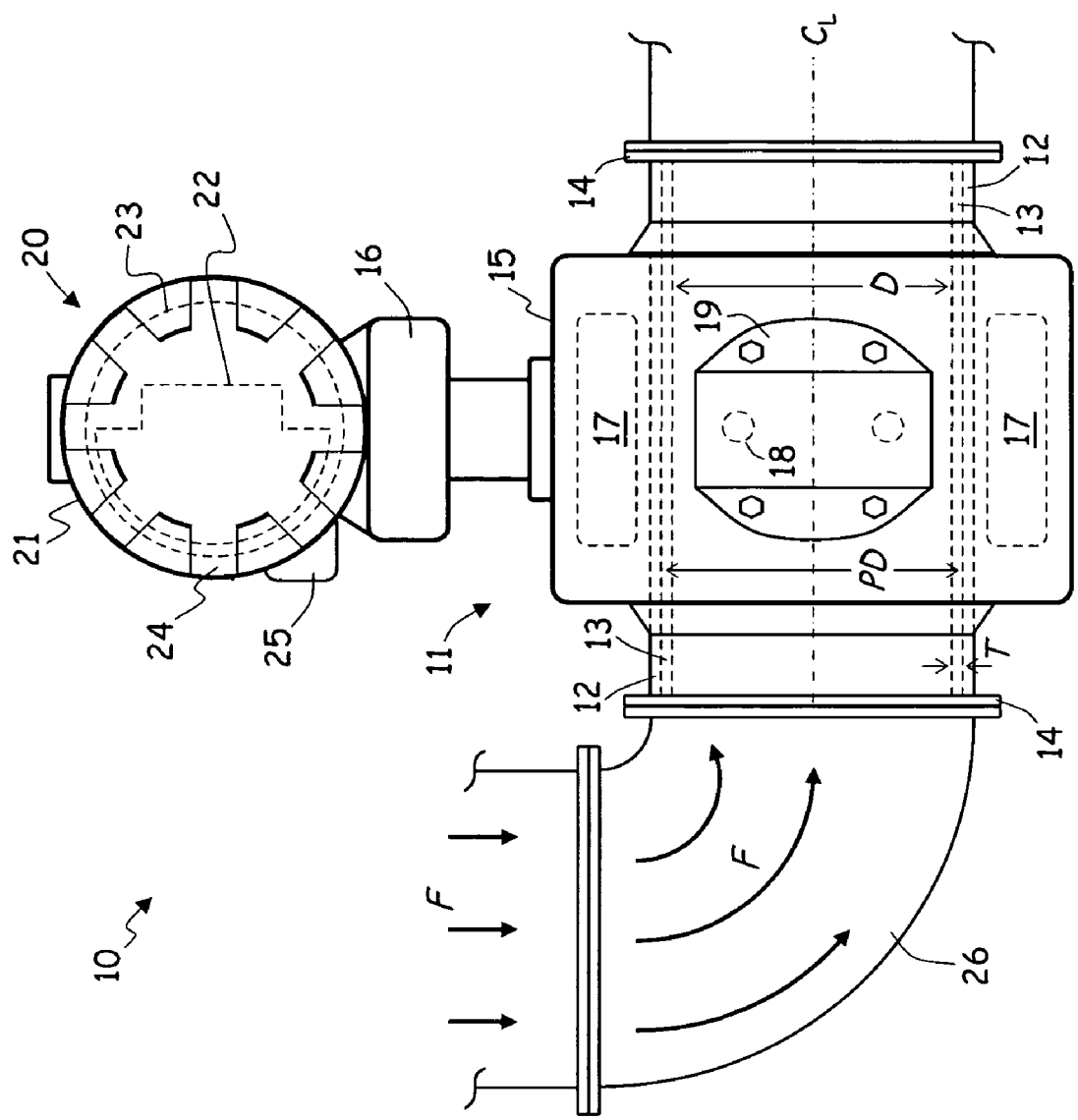
FIG. 1 is a schematic side view of a magnetic flowmeter with transmitter.

FIG. 1 is a schematic side view of magnetic flowmeter 10 with integrated transmitter 20. Flowmeter body 11 comprises pipe section 12 with liner 13 and process coupling 14, housing 15 with transmitter mount 16, coils 17, probes 18 and probe cover 19. Pipe section 12 and liner 13 are shown in cross-sectional representation, using dashed or hidden lines. Coils 17 and probes 18, which are internal to flowmeter body, are also shown in hidden lines.

Transmitter 20 is mounted to flowmeter body 11 at transmitter mount 16. Transmitter 20 comprises transmitter housing 21, terminal block 22, electronics/local operator interface (LOI) assembly 23, terminal cover 24 and conduit connection (s) 25. Terminal block 22 and LOI assembly 23 are internal to transmitter housing 21, and shown with hidden lines.

In the particular embodiment of FIG. 1, transmitter 20 is directly mounted to flowmeter body 11 via transmitter mount 16, which provides an internal path for electrical connections between transmitter 20 and flowmeter 10. In alternate embodiments, transmitter 20 is remotely mounted, and provided with external electrical and data connections to transmitter body 11. In both integrated and remote-mounted embodiments, the term "magnetic flowmeter" encompasses both flowmeter body 11, as distinct from transmitter 20, and the combination of flowmeter body 11 with transmitter 20.

In this embodiment, pipe section 12 provides a process flow channel through flowmeter body 11. Typically, pipe section 12 comprises a length of process flow pipe or conduit with a circular cross section. In one embodiment, for example, pipe section 12 comprises a circular pipe with inner (inside) diameter PD of approximately eight inches (8", or about 20 cm), but this dimension varies with application. In some embodiments, for example, PD ranges between two inches and twelve inches (2-12", or about 5-30 cm). In other embodiments, pipe diameter PD falls outside this range, or, alternatively, pipe section 12 is formed from an oval, rectangular or other non-circular conduit.

Pipe section 12 is typically manufactured of a durable, machinable, corrosion-resistant and nonmagnetic metal such as stainless steel, aluminum, copper or brass, or a combination of such materials. In alternate embodiments, pipe section 12 is formed of a durable polymer material such as PVC (polyvinyl chloride) plastic or ABS (acrylonitrile butadiene styrene) plastic, or another plastic polymer.

Liner 13 lines pipe section 12 along diameter PD, forming an electrical, chemical, and mechanical barrier between pipe section 12 and the process flow. Liner 13 insulates pipe section 12 from electrical contact with the process flow, and protects from erosion and corrosion due to chemicals or abrasives in the process fluid.

Liner 13 is typically comprised of polyurethane or another nonmagnetic insulating polymer material, but the composition varies depending upon the process fluid flow. In some embodiments, for example, protective liner 13 is comprised of Teflon®, Tefzel®, Neoprene, Ryton® PPS or natural rubber, in order to provide chemical, electrical and abrasive protection against a range of different process fluids. These and other suitable materials for liner 13 are available from a variety of commercial vendors, including DuPont and Company of Wilmington, Del., Chevron Phillips Chemical of The Woodlands, Tex., and Rosemount Inc. of Chanhassen Minn., an Emerson Process Management company. In alternate embodiments, pipe section 12 and liner 13 are formed together, utilizing a durable, insulating and non-magnetic material suitable for both pipe section 12 and liner 13, such as PVC plastic or ABS plastic.

Protective/insulating liner 13 has thickness T, such that the flow channel through flowmeter body 11 has diameter D=PD−2T. Thickness T generally scales with pipe diameter PD, although the relationship is not strictly linear. For an eight-inch (20 cm) pipe, for example, insulating liner 13 typically has thickness T of approximately 0.188 inches (0.188", or about 4.8 mm). In other embodiments, T varies from about a tenth of an inch or less (T≦0.10", or about 2.5 mm), to about one quarter inch or more (T≧0.25", or about 6.4 mm). This range corresponds generally to pipe diameters PD of approximately two inches to one foot (2"-12", or about 5-30 cm).

Process couplings 14 are formed onto one or both ends of pipe section 12, in order to form fluid couplings to a process flow system. Couplings 14 are typically comprised of the same material(s) as pipe section 12, and are formed onto pipe section 12 via a combination of machining, drilling, cutting, welding, and other fabrication techniques.

The particular structure of process coupling 14 varies from embodiment to embodiment, in order to accommodate a wide range of different process flow connections. These include, but are not limited to, through-hole bolt-mounted coupling flanges (as shown in FIG. 1), external ring and collar mounts, threaded pipe fittings, compression fittings, and a range of different surfaces suitable for mechanical or chemical welding.

Flowmeter housing 15 is formed from a combination of strong, durable, machinable materials, including steel, stainless steel, brass, aluminum, copper and a variety of durable polymers such as PVC or ABS plastic. These materials are shaped into a number of side walls, end walls, cover plates and other structures, and assembled by mechanical means such as welds, screws and bolts.

Housing 15 forms a generally annular insulating and protective enclosure about a central region of pipe section 12, including coils 17, probes 18 and other internal components of flowmeter body 11. Typically, housing 15 also forms a pressure seal against pipe section 12, to prevent the inflow of corrosive fluids, explosive gases and other hazardous agents.

Coils 17 comprise a number of copper or other conducting wire windings. Coils 17 are positioned proximate an outer radius of pipe section 12, in order to generate magnetic flux across the process flow channel when provided with an energizing current.

In some embodiments, coils 17 comprise a soft iron core to increase the magnetic flux, or to shape the field lines. In further embodiments, flowmeter body 11 comprises additional magnetically soft flux return components to improve field strength and uniformity, and to reduce fringing fields outside housing 15.

Probes (or probe electrodes) 18 comprise electrical sensors or electrodes that respond to an EMF induced across pipe section 12 by process fluid flow through the magnetic field. Probe electrodes 18 are manufactured from a corrosion-resistant and erosion-resistant conducting material, which varies depending upon the properties of the process flow and desired service life. In some embodiments, probe electrodes 18 are manufactured from a stainless steel such as 266 SST, or from tantalum, platinum, titanium, Hastelloy® or another specialty alloy. Probes of these types are available from Rosemount Inc. and other commercial vendors, including Haynes International of Kokomo, Ind.

Figure 2:
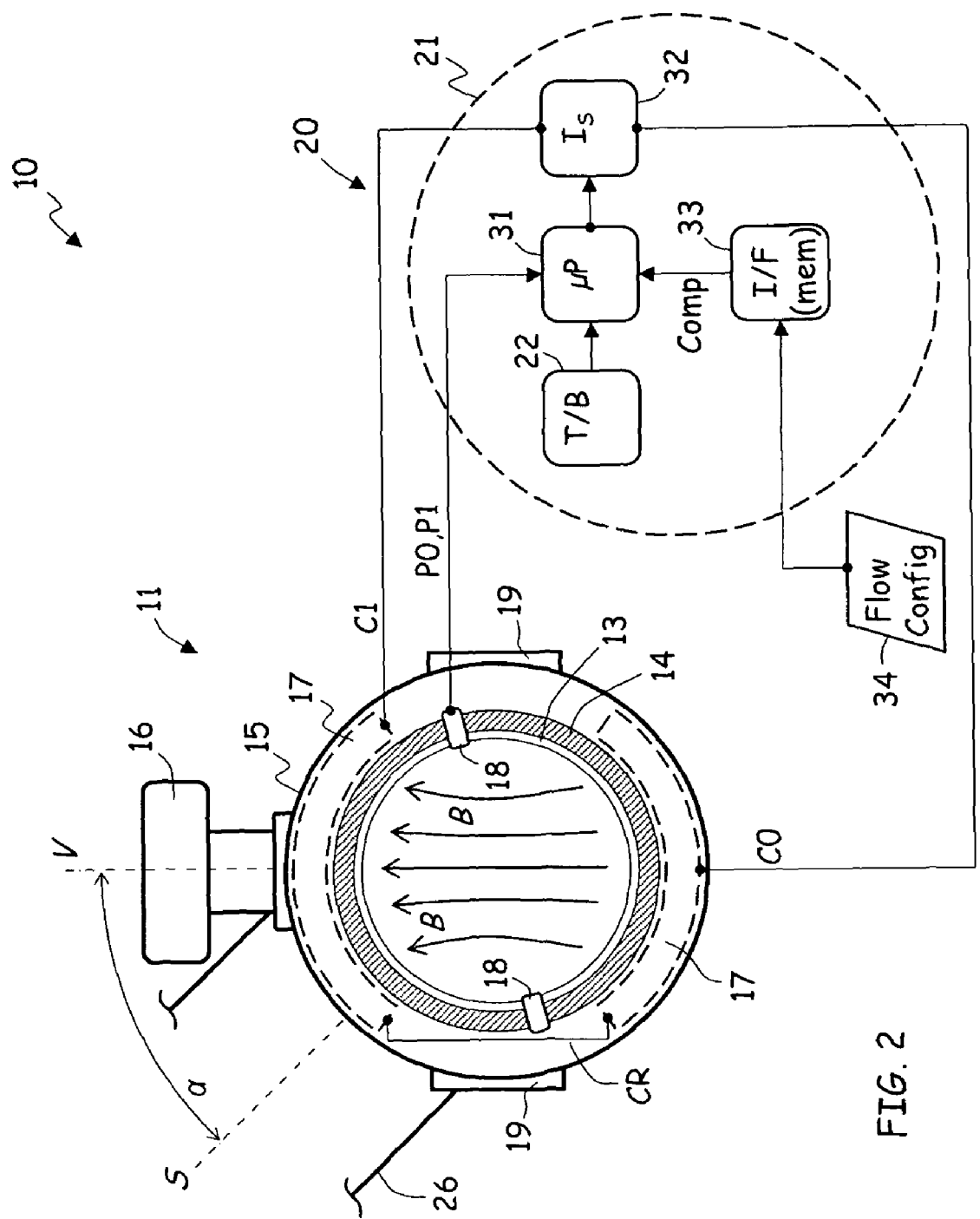
FIG. 2 is a schematic end view of the magnetic flowmeter in FIG. 1.

Flowmeter 10 comprises two opposing probes 18, one on each side of pipe section 12. Probe electrodes 18 are sometimes "clocked" or rotated about axial centerline $C_L$, as shown in FIG. 2, below, such that they do not share a horizontal plane.

In some embodiments, each probe electrode 18 is covered by a probe cover 19, but only one is shown here. When utilized, probe covers 19 form mechanical and pressure seals against flowmeter body 11. In some embodiments, probe covers 19 are removable for access to probes 18, and in other embodiments probe covers 19 are welded or otherwise permanently attached to flowmeter body 11 after probes 18 are installed.

Transmitter housing 21 is manufactured of a durable material such as metal or a durable plastic, or a combination of such materials, forming a protective enclosure about terminal block 22, electronics/LOI assembly 23 and the other internal components of transmitter 20. The enclosure provides electrical and thermal insulation, shields from adverse environmental conditions including moisture and corrosive or explosive agents, and protects from accidental contact with process machinery, tools, falling objects and other potential hazards. Transmitter housing 21 also provides internal mounting structures, which secure the internal components in place.

Terminal block 22 comprises a block body made of a durable plastic or other insulating material, with a number of electrically conducting terminal connections. The terminal connections provide power to transmitter 20, and allow input/output (I/O) and process control access via a loop wire, a control bus, a data bus, data cables or similar means of process system communications. Terminal block cover 24 forms a pressure seal with transmitter housing 21, and provides access to the connections on terminal block 22. Conduit connection(s) 25 provide conduit entries for external circuits.

Electronics/LOI assembly 23 includes a local operator interface (LOI) and a number of different circuit elements including, but not limited to, a controller for controlling magnetic flowmeter 10 and transmitter 20, a current or voltage source for energizing coils 17, a signal processor for processing voltage signals from probes 18, and a remote user interface for communicating between transmitter 20 and a process control system.

In typical embodiments, electronics/LOI assembly 23 comprises distinct LOI and current source components, as well as a microprocessor/controller (see FIG. 2, below). An electronics/LOI cover (on the back of transmitter 20, not shown in FIG. 1) provides operator access to the LOI, and accommodates an interactive display. The LOI provides for user input of the flowmeter's installed flow configuration, including upstream and downstream flow pipe disturbances.

FIG. 1 is representative of a wide range of alternate embodiments. While transmitter 20 is shown in an integrated or direct-mount embodiment, for example, in other embodiments transmitter 20 is remotely locatable up to one thousand feet (1,000', or about 300 m) from flowmeter 10. In remote embodiments, electrical connections between transmitter 20 and flowmeter body 11 are provided via cables, wires, a data bus, a control bus or other means of electrical and data communication, analogous to those described above for the process control system.

The individual flowmeter and transmitter components also vary somewhat in form and detail from embodiment to embodiment. As shown in FIG. 1, for example, flowmeter 10 represents a particular 8700-series magnetic flowmeter, as available from Rosemount Inc. In alternate embodiments, flowmeter 10 represents any of a wide range of commercially available or customized magnetic flowmeter designs, to which the distinctive measurement and compensation techniques described herein are applied.

In operation of flowmeter 10, transmitter 20 provides an energizing current to coils 17. Coils 17 generate a magnetic field across the process flow in pipe section 12, and probes 18 sense the EMF induced across the process flow by the magnetic field. Transmitter 20 then determines the process flow rate as a function of the induced EMF, which is sampled via electrical connections between probes 18 and electronics/LOI assembly 23.

In contrast to previous magnetic flowmeter designs, transmitter 20 also corrects the measured flow rate based on the flow pipe configuration proximate flowmeter 10, as actually installed in a process flow system. This contrast with previous designs, which assume that the installation conforms to a recommended straight-pipe or straight-flow installation region, extending upstream and downstream of flowmeter 10, in order to provide uniform flow through the magnetic field.

The recommended straight-flow installation zone typically extends for five pipe diameters or more, based on inner diameter PD of pipe section 12. For example, one particular installation region extends at least five pipe diameters upstream of magnetic flowmeter 10, and an additional two pipe diameters downstream of magnetic flowmeter 10, exclusive of the length of pipe section 12 itself. This is not always practical, however, due to size, engineering, cost and time constraints. As a result, some flowmeters are installed in non-conforming configurations, in which a flow pipe disturbance is located in the recommended "straight-flow" installation region.

Pipe elbow 26, located just upstream of flowmeter 10 in FIG. 1, represents one such non-conforming flow pipe disturbance. In particular, pipe elbow 26 forms a 90-degree turning flow disturbance in the upstream installation zone, within five pipe diameters of flowmeter body 11, as measured from the upstream end of pipe section 12.

Pipe elbow 26 changes the direction of process flow F, introducing vortex flow, swirl, and other non-uniform or non-axial components into the process flow. These effects are particularly significant at the entrance and exit to pipe elbow 26, but extend in both upstream and downstream directions from the originating structure.

Typically, non-uniform flow components decrease in straight-flow regions, which is the reason for the recommended straight-flow installation zone surrounding flowmeter 10. In conforming installations, therefore, there is typically sufficient straight flow to ensure substantially uniform and axial flow along centerline $C_L$ through pipe section 12. In non-conforming installations, however, there is insufficient straight pipe length, resulting in non-axial and asymmetric flow components that degrade magnetic flowmeter accuracy.

Flowmeter 10 addresses this problem by correcting the flow measurement as a function of the actual installed flow configuration. Specifically, flow pipe disturbances in the installation region are input to transmitter 20, either via the LOI assembly or a remote user interface in communication with the process control system. This allows the measurement to be corrected based on the flow pipe disturbance, using extensive calibration testing of a wide range of different disturbances, both upstream and downstream of the flowmeter.

Some flow pipe disturbances turn the process flow, such as pipe elbow 26 and other elbow structures with a range of turning angles, including double-elbows, j-tubes and u-tubes. Pipe tees and related devices turn the process flow as well, but also merge or split the flow into convergent or divergent streams. Additional flow pipe disturbances change the pipe diameter (and cross-sectional area), including pipe expanders, pipe reducers, and other pipe adaptors or flow constrictors. Valves and other flow control devices also change the cross-sectional flow area, in order to control the flow rate.

By compensating the process flow measurement as a function of the installed flow configuration, magnetic flowmeter 10 provides accurate flow measurement even in non-conforming installations. This not only improves process control, but also provides magnetic flowmeter 10 with a wider and more flexible range of installation options, reducing design requirements and lowering installation time and cost.

FIG. 2 is a schematic end view of magnetic flowmeter 10. Flowmeter 10 comprises flowmeter body 11 with pipe section 12 (shown in diagonal lines). FIG. 2 also shows transmitter 20, but the transmitter components are represented in schematic rather than physical form.

Flowmeter body 11 comprises pipe section 12 with liner 13, housing 15, transmitter mount 16, coils 17 and probe electrodes 18 with electrode covers 19. Flowmeter housing 15 forms an annular enclosure about pipe section 12, liner 13, coils 17 and electrodes 18, as described above, with probe covers 19 covering electrodes 18 on each side of housing 15.

Protective liner 13 lines pipe section 12 along the inner pipe diameter, forming an insulated process flow channel through flowmeter body 11. The process flow is directed out of the page in FIG. 2, through magnetic field B as provided by coils 17. The process coupling on the end of pipe section 12 is not shown in this view.

Transmitter 20 comprises transmitter housing 21, which encloses terminal block (T/B) 22 and the electronics/LOI assembly, including microprocessor/controller (μP) 31, current source ($I_S$) 32 and user interface/memory device (I/F) 33.

Terminal block 24 provides power to microprocessor/controller 31 and the other components of transmitter 20, via connection to an external power supply (not shown). In some embodiments, the external connection is made via a single loop wire, which also provides process control communications via a superimposed digital or analog signal. In other embodiments, communications take place over any combination of standard analog wire loops, control buses and data cables, or via infrared, optical, RF (radio-frequency) and other wireless devices. Transmitter 20 also utilizes a variety of different process communication protocols including, but not limited to, standard analog (4-20 mA) protocols, hybrid analog-digital protocols such as HART®, and digital measurement and control protocols such as Fieldbus Foundation™ and PROFI®BUS/PROFI®NET. Transmitters configured for these and other means of communication are available from Rosemount Inc. and other commercial vendors.

Microprocessor/controller 31 is in electrical communication with probes 18 via probe wires P0 and P1 (which are combined in FIG. 2). Microprocessor/controller 31 comprises a signal processor for calculating the flow rate as a function of the probe signal (that is, as a function of the induced EMF or Faraday voltage), and a current controller for controlling current supply 32.

In some embodiments, user interface/memory device (I/F) 33 is simply an LOI (local operator interface). This allows the user/installer to input and store flow configuration 34 immediately after installation, for instance via an interactive display mounted directly to transmitter 20. In other embodiments, I/F 33 represents a remote process control interface, and configuration 34 is input remotely via the process control system. In further embodiments, configuration 34 is input during manufacture, or a number of different configurations are input and one or more are selected based on the installation configuration. More generally, user I/F and storage device 33 represents any of an LOI, a process control interface, a programming interface or other means for inputting configuration 34 to a computer memory, a hardware or software register or buffer, a data disc or other data storage device or medium configured to receive and store configuration 34 for use in compensating the output of flowmeter 10.

Current source 31 comprises a current-limited or voltage-limited power supply, which energizes coils 17 via coil drive wires C0 and C1. In typical embodiments, coils 17 are "daisy chained" (or connected in series) via coil return CR. In these embodiments, each coil 17 carries the same current, and contributes approximately equally to the overall field strength. In other embodiments, current/voltage source 31 provides individually controlled energizing currents for a number of different coils 17.

When current source 32 energizes flowmeter 10, coils 17 generate relatively uniform magnetic field B inside pipe section 12, across the process flow conduit within protective liner 13. Over a wide operating range, the field strength (or magnetic flux density) is approximately proportional to the energizing current. As shown in FIG. 2, magnetic field B is oriented perpendicularly across pipe section 12, such that the process flow intersects the field at a normal angle of incidence.

Probes 18 extend through pipe section 12 and liner 13 to form direct electrical contact with the process flow. As shown in FIG. 2, probes 18 are diametrically opposed across pipe section 12, but are "clocked" or rotated about the central axis with respect to the horizontal, typically by about forty-five degrees (45°). Alternatively, probes 18 are not clocked, such that they are horizontally aligned. Probe covers 19 are sometimes not provided for clocked probe configurations, but flowmeter body 11 encompasses both clocked and non-clocked designs, either with or without probe covers 19.

When a conducting process fluid flows through magnetic field B, a Faraday loop forms across probe electrodes 18. This allows magnetic flowmeter 10 to generate an induced EMF signal or Faraday voltage, which is a function of the process flow rate and the magnetic field strength. Probes 18 sense the EMF, and transmit it to the signal processor (microprocessor/controller 31) via probe lines P0 and P1.

The induced EMF signal is substantially proportional to the flow velocity of the process fluid, which in turn is proportional to the volume flow rate. More specifically, the induced EMF (E) is proportional to the average flow velocity (V), average magnetic field strength B, and diameter D of the flow channel. That is, $$E = kBDV, \quad [1]$$

where k (the "k-factor") is a proportionality constant that depends upon the units in which E, B, D and V are measured.

Inverting EQ. 1, the process flow velocity is given as a function of the induced potential, the magnetic field strength, and diameter D:

$$V = \frac{E}{kBD}. \quad [2]$$

The flow velocity is thus directly proportional to the induced EMF, and indirectly proportional to the magnetic field strength and diameter of the flow channel. The volumetric flow rate, in turn, is just the flow velocity times the flow area.

In some embodiments, transmitter 20 is configured for pulsed DC (direct-current) magnetic flow measurement. In these embodiments, microprocessor/controller 31 varies or modulates current source 32 in order to reduce signal noise. Pulsed-DC measurements lessen the effects of electrolytic reactions between the process fluid and probe electrodes 18, as well as capacitive couplings between coils 15 and external electrical systems, stray voltage and current loops, phase shifts due to process flow impedance, and quadrature voltage effects including inductive couplings between the magnetic field, the process fluid and the probe signal lines.

Even the most sophisticated magnetic flowmeter designs, however, are sensitive to non-uniform flow. In particular, EQS. 1 and 2 assume that the flow velocity is fairly represented by average value V, but even under ideal straight-pipe flow conditions this is an approximation. Pipe flow is typically turbulent, and the velocity profile varies across the flow channel. To account for such effects, flowmeters are calibrated over a wide operational range, by comparing the measured flow rate to "absolute" flow values obtained by other means. Essentially, these calibrations amount to adjusting the k-factor to obtain flow rate measurements that more precisely reflect actual process flow through the flowmeter.

When flow pipe disturbances are located near a magnetic flowmeter, in either the upstream or downstream direction they distort the velocity profile. In particular, pipe flow disturbances introduce swirl and other non-axial, non-rotationally symmetric flow components, so that the calibrated measurement function no longer corresponds to the actual flow rate. Typically the effect is systematic, and generates a fixed or proportional offset that degrades measurement accuracy across a wide range of flow rates. Magnetic flowmeter 10 addresses this problem by compensating the flow rate as a function of installed flow configuration 34, as described via input to interface 33 and provided via a data connection (Comp) to microprocessor/controller 32.

The flow configuration is typically input to I/F 33 via a menu that describes each relevant flow disturbance in terms of type, including, but not limited to, elbow, expander, reducer, valve, or tee, as well as the location of the disturbance (usually measured in pipe diameters), and whether it is upstream or downstream of flowmeter 10. The input also includes a number of type-specific parameters, including elbow or turn angle, expansion or reduction in pipe diameter, and change in cross-sectional area. Valve disturbances also require a valve position parameter, which describes the proportional flow reduction for a range of different gate, globe, ball, butterfly, and other valve types.

Flow configuration input 34 to I/F 33 also includes rotational angle α, as determined between vertical axis V of flowmeter body 11 and orientation angle S of the flow disturbance. In FIG. 2, for example, rotational angle α represents the rotation of elbow 26 by about forty-five degrees about the flow axis. This affects the flow measurement, because the various non-uniform flow components are not rotationally symmetric. In particular, rotation of elbow 26 with respect to probes 18 and magnetic field B changes the relationship between the observed EMF signal and the actual flow rate, and thus requires a compensation function that incorporates rotational angle α.

To correct for each of these effects, flowmeter 10 is calibrated for non-conforming installations characterized by a wide range of different flow pipe disturbances. Each disturbance is introduced at different locations upstream and downstream of the flowmeter, and configured with a variety of different rotational angles, turning angles and other type-specific disturbance parameters. The uncompensated flow rate is then compared to the actual flow rate, allowing magnetic flowmeter 10 to be empirically corrected in any of the tested configurations. Mathematical calibrations are also used, both to extrapolate between test points and to expand the calibration range.

In one sense, the calibration process is equivalent to re-calculating the k-factor based on the actual installed flow configuration, rather than an idealized "straight-flow" installation. Typically, the correction is substantially constant over a wide operational range, for example between about two hundred to one thousand gallons per minute or more (that is, from about 200-1,000 gpm, or about 10-75 l/s). In other embodiments, the correction is also a function of flow rate, temperature, or other process parameter.

Operationally, the correction can either be made in two steps, by first calculating the flow rate with an idealized or generic k-factor and then correcting the result as a function of the actual installed configuration, or in a single step, by simply using an installation-specific k-factor. The installation-specific k-factors is based on non-conforming flow pipe disturbances actually in place proximate the flowmeter, rather than a generic k-factor based on an idealized or conforming configuration with straight flow both upstream and downstream of the flowmeter.

This substantially improves accuracy in non-conforming installations. The rated accuracy of flowmeter 10, for example, is generally less than one percent (1%) of the actual volume flow rate, and typically between two tenths of a percent and half a percent or less of the actual volume flow rate (0.2% to ≤0.5%). In previous designs, this accuracy is not always attained in non-conforming installations. By compensating the measured flow rate based on the upstream and downstream flow pipe disturbances, however, flowmeter 10 achieves its rated accuracy even in non-conforming flow configurations, significantly improving process control and providing greater system design flexibility.

Although the present invention has been described with reference to preferred embodiments, the terminology used is for the purposes of description, not limitation. Workers skilled in the art will recognize that changes may be made in form and detail without departing from the spirit and scope of the invention.

The invention claimed is:

1. A transmitter for a magnetic flowmeter, the transmitter comprising:
    a current source for energizing the flowmeter, such that the flowmeter generates an induced electromotive force in response to a process flow;
    memory for storing a non-conforming flow configuration, wherein the non-conforming flow configuration describes an actual flow pipe disturbance in the process flow, and wherein the flow pipe disturbance is located within five pipe diameters upstream or two pipe diameters downstream of the magnetic flowmeter, as installed in the process flow; and
    a signal processor for determining a flow rate as a function of the induced electromotive force and the non-conforming flow configuration;
    wherein the signal processor corrects the flow rate based on the flow pipe disturbance such that the magnetic flowmeter achieves a rated accuracy of one fifth percent to less than one half percent in the non-conforming flow configuration.

2. The transmitter of claim 1, wherein the flow pipe disturbance is located within five pipe diameters upstream of the magnetic flowmeter.

3. The transmitter of claim 1, wherein the flow pipe disturbance is located within two pipe diameters downstream of the magnetic flowmeter.

4. The transmitter of claim 1, wherein the flow pipe disturbance comprises a valve.

5. The transmitter of claim 1, wherein the flow pipe disturbance comprises a reducer or an expander.

6. The transmitter of claim 1, wherein the flow pipe disturbance comprises an elbow.

7. The transmitter of claim 1, wherein the flow pipe disturbance comprises a tee.

8. The transmitter of claim 1, wherein the function of the non-conforming flow configuration comprises a rotational angle of the flow pipe disturbance.

9. The transmitter of claim 1, further comprising a local user interface for inputting the non-conforming flow configuration to the memory.

10. The transmitter of claim 1, further comprising a remote interface for inputting the non-conforming flow configuration to the memory.

11. A magnetic flowmeter comprising:
    a pipe section;
    a coil proximate a radially outer boundary of the pipe section;
    a current source for energizing the coil to generate a magnetic field inside the pipe section;
    a probe extending through the pipe section to sense a Faraday voltage induced by process flow through magnetic field;
    a storage device for storing a non-conforming flow configuration representing an actual flow pipe disturbance in the process flow, wherein the flow pipe disturbance is located within five pipe diameters upstream or two pipe diameters downstream of the magnetic flowmeter, as installed in the process flow; and
    a processor to determine a rate of the process flow as a function of the Faraday voltage and the non-conforming flow configuration;
    where in the signal processor corrects the rate of the process flow based on the flow pipe disturbance such that the magnetic flowmeter achieves a rated accuracy of one fifth percent to less than one half percent in the non-conforming flow configuration.

12. The flowmeter of claim 11, wherein the flow pipe disturbance comprises a change in cross-sectional flow area.

13. The flowmeter of claim 11, wherein the flow pipe disturbance comprises a change in flow direction.

14. The flowmeter of claim 11, further comprising an interface for inputting the configuration representing the flow pipe disturbance to the storage device.

15. A method for measuring a flow rate, the method comprising:

storing a non-conforming flow configuration describing an actual flow pipe disturbance in a process flow, wherein the flow pipe disturbance is located within five pipe diameters upstream or two pipe diameters downstream of a magnetic flowmeter, as installed in the process flow;

generating a magnetic field across the process flow;

sensing an electromotive force induced across the process flow by the magnetic field; and determining the flow rate as a function of the electromotive force and as a further function of the non-conforming flow configuration; and correcting the flow rate based on the flow pipe disturbance such that the magnetic flowmeter achieves a rated accuracy of one fifth percent to less than one half percent in the non-conforming flow configuration.

16. The method of claim 15, wherein storing the flow configuration comprises storing an upstream or downstream position of the flow pipe disturbance in the process flow.

17. The method of claim 16, wherein storing the flow configuration comprises storing a type of the flow pipe disturbance in the process flow.

18. The method of claim 17, wherein storing the flow configuration comprises storing a rotational angle of the flow pipe disturbance in the process flow.

19. The method of claim 15, wherein the further function of the flow configuration comprises a k-factor based on a calibration of the flow rate when subject to the flow pipe disturbance in the process flow.

* * * * *